United States Patent [19]

Kuzunuki et al.

[11] Patent Number: 4,680,804
[45] Date of Patent: Jul. 14, 1987

[54] METHOD FOR DESIGNATING A RECOGNITION MODE IN A HAND-WRITTEN CHARACTER/GRAPHIC RECOGNIZER

[75] Inventors: Soshiro Kuzunuki, Katsuta; Hiroshi Shojima, Hitachi; Takanori Yokoyama, Hitachi; Yasushi Fukunaga, Hitachi; Kotaro Hirasawa, Hitachi, all of Japan

[73] Assignee: Hitachi, Ltd., Tokyo, Japan

[21] Appl. No.: 716,943

[22] Filed: Mar. 28, 1985

[30] Foreign Application Priority Data

Mar. 28, 1984 [JP]   Japan ................................. 59-58298

[51] Int. Cl.⁴ ............................................. G06K 9/00
[52] U.S. Cl. ...................................... 382/13; 382/24; 382/36
[58] Field of Search .................... 340/747; 382/11, 13, 382/22, 23, 24, 25, 36, 37, 38, 39, 40, 50; 358/283

[56] References Cited

U.S. PATENT DOCUMENTS

| | | | |
|---|---|---|---|
| 4,365,235 | 12/1982 | Greanias et al. | 382/13 |
| 4,516,262 | 5/1985 | Sakurai | 382/22 |
| 4,531,231 | 7/1985 | Crane et al. | 382/13 |

FOREIGN PATENT DOCUMENTS

| | | | |
|---|---|---|---|
| 0143681 | 11/1980 | Japan | 382/13 |
| 0063671 | 5/1981 | Japan . | |
| 0105084 | 6/1982 | Japan . | |

*Primary Examiner*—Leo H. Boudreau
*Assistant Examiner*—Jose L. Couso
*Attorney, Agent, or Firm*—Antonelli, Terry & Wands

[57] ABSTRACT

A hand-written character/graphic is recognized in a character recognition mode or a graphic recognition mode designated in accordance with stroke information supplied from a tablet input device which samples the hand-written character/graphic and converts it to the stroke information. The recognition mode is automatically designated by comparing a longer one of projection lengths on x-axis and y-axis of stroke coordinates with a predetermined threshold for a hand-written character input.

8 Claims, 18 Drawing Figures

METHOD FOR DESIGNATING A RECOGNITION MODE IN A HAND-WRITTEN CHARACTER/GRAPHIC RECOGNIZER

CROSS-REFERENCES OF THE RELATED APPLICATIONS

This application relates to an application U.S. Ser. No. 716,944 filed Mar. 28, 1985, entitled "Apparatus for Recognizing and Displaying Handwritten Characters and Figures" by Fukunaga et al and assigned to the present assignee, based on Japanese patent application No. 59-60717 filed Mar. 30, 1984, and whose disclosure is incorporated herein by reference.

BACKGROUND OF THE INVENTION

The present invention relates to a hand-written character/graphic recognizer, and more particularly to a method for designating a recognition mode necessary to separate hand-written characters/graphics.

In Japanese Patent Application Laid-Open No. 55-143681 entitled "Hand-writing Word Processor Using a Tablet" (laid open Nov. 10, 1980), function keys are provided to designate a recognition mode of characters/graphics graphics so that an operator depresses them by a stylus. In this designation method, the function key must be depressed whenever a hand-written character/graphic is to be entered and hence it has a low non-machine interface.

Japanese patent publication No. 58-42513 entitled "Real-time Hand-written Character Recognizer" (published Sept. 20, 1983) teaches the designation of recognition modes in the character recognition, such as alphanumeric mode, Katakana mode, Kanji mode and Hirakana mode. In this recognizer, the number of input strokes is examined and if it is larger than a predetermined number, the recognition mode is automatically switched to the Kanji/Hirakana mode.

Japanese Patent Application Laid-Open No. 57-105084 entitled "Method for Separating Characters from Graphics" (laid open June 30, 1982) discloses a method for recognizing characters separately from graphics. A drawing containing both characters and graphics is read by a scanner and the read image is repeatedly enlarged or reduced to separate the characters from the graphics in an off-line method. It relates to an off-line recognition in which characters and graphics are written or drawn on a sheet which is then scanned for recognition. It cannot be applied to an on-line hand-written character/graphic recognition.

Thus, in the past, there has been no effective method for automatically designating the recognition mode for the characters/graphics in the hand-written character/graphic recognizer. When a drawing containing characters is to be prepared, the operator must designate the recognition mode and the man-machine interface is not excellent.

SUMMARY OF THE INVENTION

It is an object of the present invention to provide a method for automatically designating a recognition mode of a hand-written character/pattern recognizer.

In accordance with the present invention, based on the finding that strokes of a hand-written character are written in small rectangular areas, characteristic values for recognizing the character/graphic are extracted from stroke coordinates and the character recognition mode or the graphic recognition mode is automatically designated in accordance with the characteristic values. Major characteristic values are a maximum one of projection length of the stroke coordinate on x-axis and y-axis, and a stroke length.

In the present invention, the characteristic values are extracted each time the stroke information is inputted.

DESCRIPTION OF THE PREFERRED EMBODIMENTS

Figure 1:
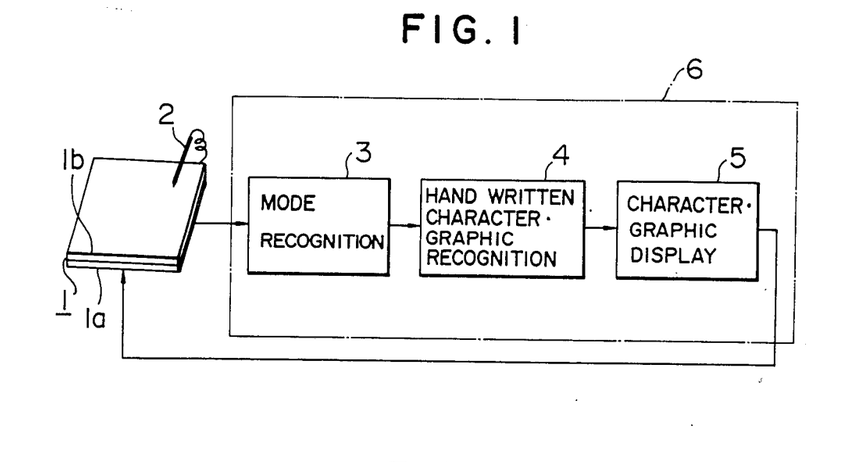
FIG. 1 is an overall block diagram of one embodiment of an on-line hand-written character/graphic recognizer of the present invention.

Referring to FIG. 1, numeral 1 denotes an input/display device which includes input means 1a for detecting and inputting hand-written character/graphic coordinates and display means 1b for displaying characters/graphics. For example, the input means may be an electromagnetic induction tablet and the display means may be a liquid crystal display device. The input/display device may be constructed by applying a transparent tablet onto the liquid crystal display device.

Numeral 2 denotes a stylus for hand-writing input. It also provides touch-up and touch-down information of the stylus.

Numeral 6 denotes a character/graphic recognizer which includes a mode recognition unit 3 for selecting a character or graphic mode, a hand-written character/graphic recognition unit 4 and a character/graphic display unit 5 for displaying characters/graphics on the display means 1b. It may be a microprocessor.

The operation is now briefly explained. The stroke information written on the input means 1a by the stylus 2 is inputted to the mode recognition unit 3 in which a characteristic value is extracted from the stroke coordinates included in the stroke information, the character or graphic recognition mode is selected based on the extracted characteristic value, and the hand-written character or graphic is recognized in the selected recognition mode and the recognition result is displayed on the display 1b through the character/graphic display unit 5.

The characteristic feature of the present invention resides in the mode recognition unit 3 which is now explained in detail.

Figure 2:
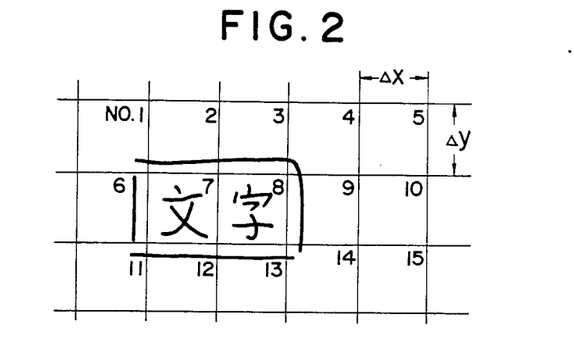
FIG. 2 shows an example of hand-written strokes.

FIG. 2 shows an example of hand-written strokes. Characters "文字" are written in a rectangle. In order to facilitate entry of the hand-written characters/graphics, the input means are sectioned by a predetermined size section ($\Delta x \times \Delta y$). The small rectangular regions are designated by numbers Nos. 1-15.

Figure 3:
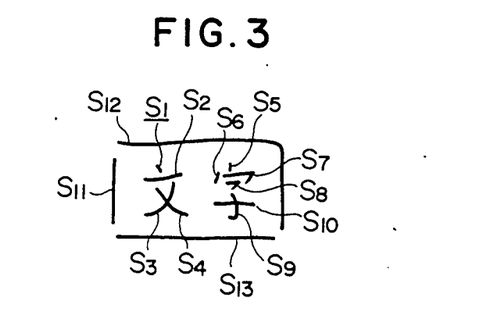
FIG. 3 shows an input order of the hand-written strokes shown in FIG. 2.

When such hand-written characters and graphics are entered by the strokes $S_1$-$S_{13}$ shown in FIG. 3, it is not clear which strokes are character strokes and which strokes are graphic strokes.

Figure 4:
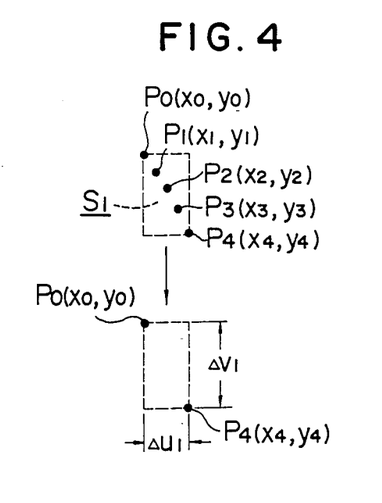
FIG. 4 illustrates extraction of a characteristic value from stroke coordinates.

In the present invention, a characteristics value as shown in FIG. 4 is determined based on the stroke coordinates. For example, a projection length $\Delta u_1$ on the x-axis and a projection length $\Delta v_1$ on the y-axis are determined based on coordinates $P_0$-$P_4$ of the stroke $S_1$ and a longer one of $\Delta U_1$ and $\Delta V_1$ is selected as the characteristic value. The projection length can be easily determined based on minimum and maximum x-coordinates of the stroke and minimum and maximum y-coordinates of the stroke.

Figure 5:
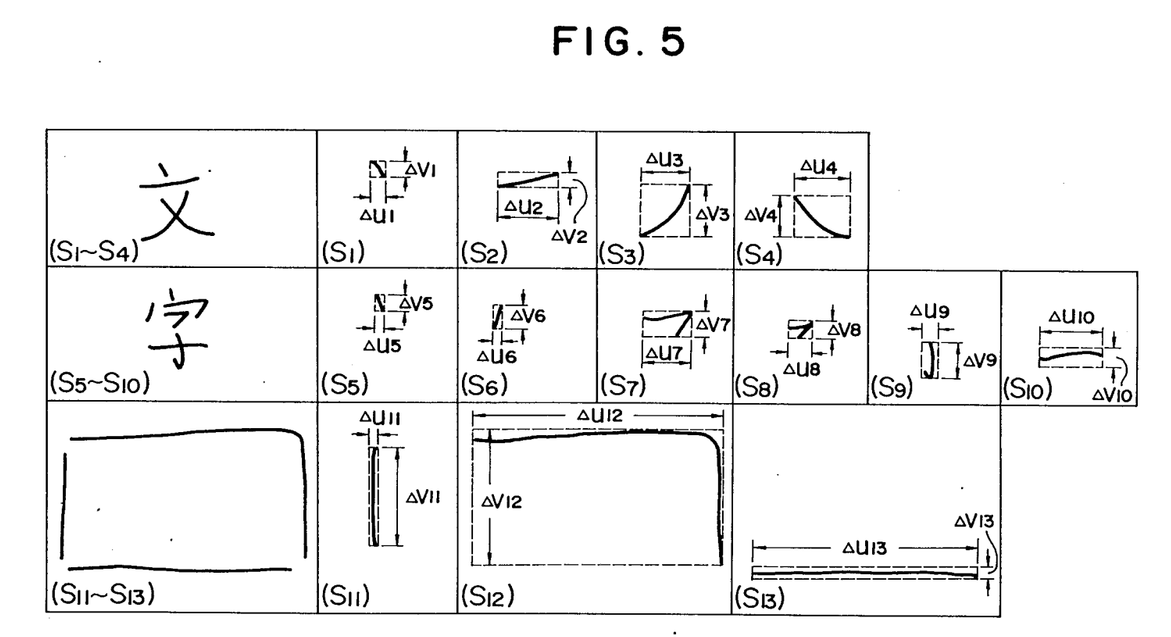
FIG. 5 shows projection lengths of all of the hand-written strokes shown in FIG. 2.

The projection lengths for all of the strokes shown in FIG. 2 are shown in FIG. 5. It is seen from FIG. 5 that the projection lengths of the strokes $S_1$-$S_{10}$ which are character strokes are short and the projection lengths of the strokes $S_{11}$-$S_{13}$ which are graphic strokes are long. Accordingly, the projection length is compared with a predetermined threshold and if the projection length is smaller than the threshold, it relates to the character stroke and hence the character recognition mode is selected, and if the comparison result is opposite, it relates to the graphic stroke and the graphic recognition mode is selected. In the character recognition, segmentation for segmenting the input stroke into an appropriate number of sections is required. Accordingly, the input means is sectioned by appropriate section as shown in FIG. 2 to effect the segmentation by those sections. In the segmentation, the strokes in one section are regarded as the strokes of the same character.

Figure 6:
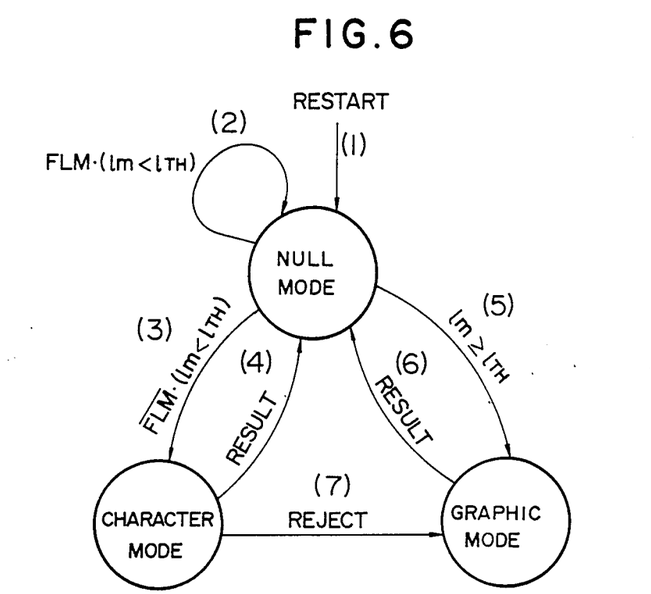
FIG. 6 shows a status transition of recognition modes.

FIG. 6 shows a status transition of the recognition mode. Three recognition modes null, character recognition and graphic recognition are included. The null mode is other than the character mode and the graphic mode, and in the null mode, the stroke information is stored in a buffer or the stroke information is not available (recognition has not been completed).

At RESTART (1), the mode is the null mode and the input of the stroke information is monitored. The mode is transitioned from the null mode under condition (2), (3) or (5).

Transition under condition (2): $\overline{FLM} \cdot (lm < l_{TH})$

Transition under condition (3): $\overline{FLM} \cdot (lm < l_{TH})$

Transition under condition (5): $lm \geq l_{TH}$ where lm is the projection length, $l_{TH}$ is the predetermined threshold, FLM is a condition under which a start point of the stroke is present in the same section, and $\overline{FLM}$ is the opposite condition.

In the transition condition (3), the strokes are stored in the memory buffer until the character strokes are segmented. On the other hand, for the graphic, the graphic and the connecting line are frequently drawn in one stroke. Accordingly, the mode is transitioned to the graphic mode if the characteristic value is larger than the predetermined threshold as shown by the condition (5).

When the reoognition in the character or graphic recognition mode is completed, the mode returns to the null mode at RESULT (4) or (6). If the recognition result is rejected at REJECT (7) (character does not match to characters in a dictionary), the mode is transitioned to the graphic recognition mode and the graphic recognition is effected. This is effective when a special graphic pattern not contained in the dictionary is to be recognized.

Figure 7:
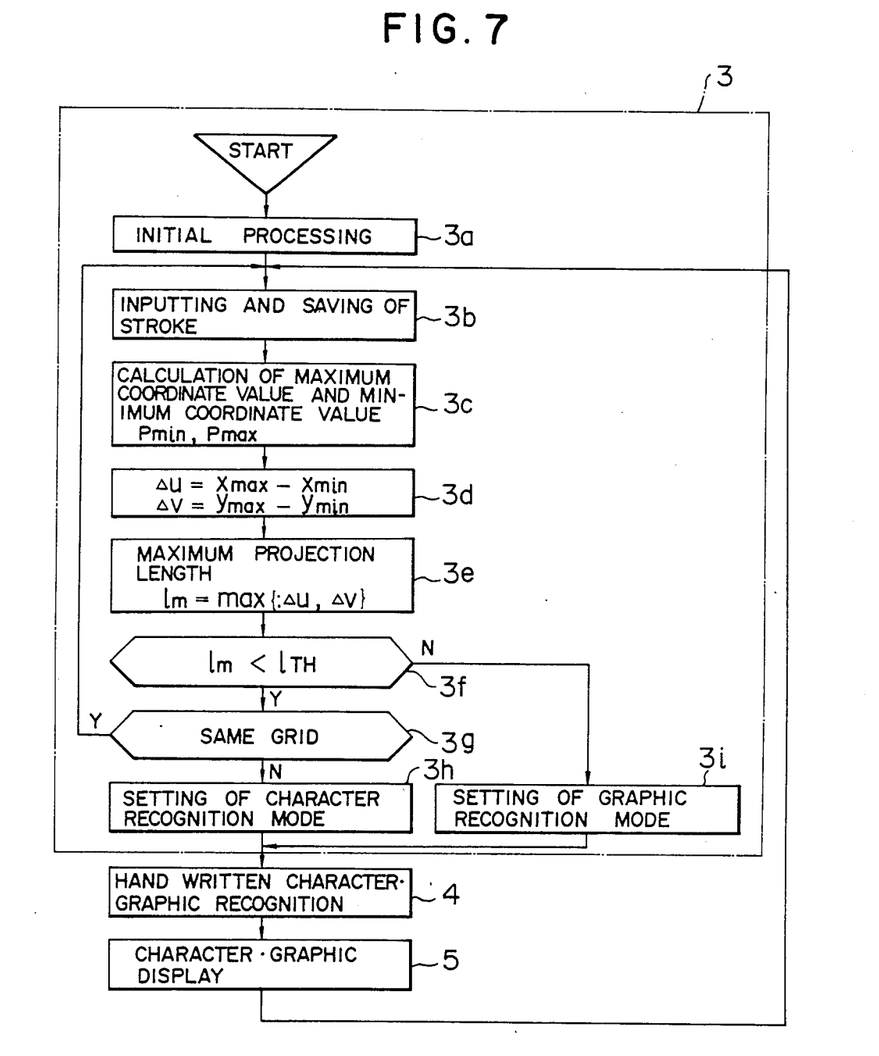
FIG. 7 shows a processing flow chart for mode recognition unit 3 shown in FIG. 1 which is a characteristic of the present invention.

FIG. 7 shows a processing flow for implementing the units 3, 4 and 5 of FIG. 1. Since the hand-written character/graphic recognition unit 4 and the character/graphic display unit 5 are known units, the explanation thereof is omitted. In the following description, the mode recognition unit 3 which is the characteristic feature of the present invention is explained in detail.

Steps 3a-3i in FIG. 7 relate to the mode recognition unit 3. Initialization such as clearing of tables and initialization for calculation of the characteristic value of the stroke is first effected (step 3a), and the hand-written strokes are inputted and stored in the buffer (step 3b). The buffer is a ring buffer as shown on a table STROKE of FIG. 10. For example, strokes $S_1$-$S_4$ are sequentially stored. As the stroke is inputted, an input pointer INP is updated. On the other hand, when the recognition is completed, an output pointer OUTP is updated. The input pointer INP cannot overrun the output pointer OUTP. If the buffer is full, the old strokes are thrown away. Since the buffer usually has a sufficiently large capacity (for example, 4K bytes), the stroke data is not thrown away.

In steps 3c-3e, the characteristic value necessary for the mode recognition is calculated based on the stroke coordinates stored in the stroke table STROKE. A minimum coordinate $P_{min}$ and a maximum coordinate $P_{max}$ are calculated based on the stroke coordinates (step 3c), and projection lengths $\Delta u$ and $\Delta v$ on the x-axis and the y-axis are determined (step 3d).

$$\begin{cases} \Delta u = x_{max} - x_{min} \\ \Delta v = y_{max} - y_{min} \end{cases} \quad (1)$$

and the larger one of the projection lengths is selected as the characteristic value lm (step 3e).

$$lm = \max\{\Delta u, \Delta v\} \quad (2)$$

Figure 10:
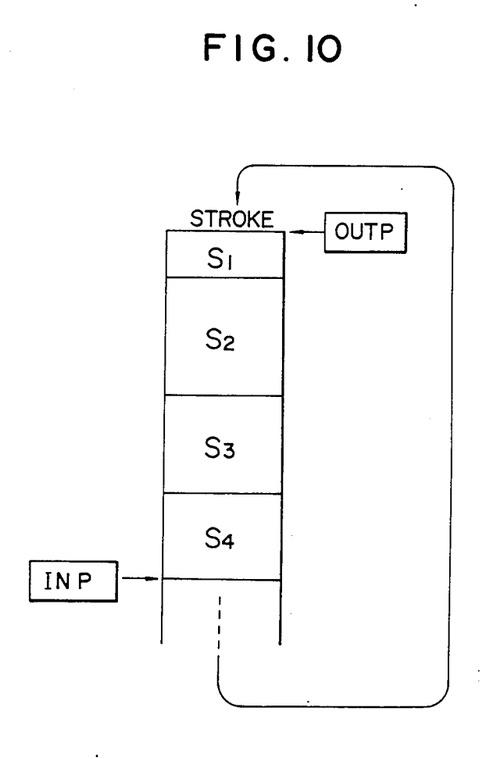
FIG. 10 is a stroke table for a buffer used in the present invention.

The characteristic value lm is compared with the predetermined threshold $l_{TH}$ (step 3f), and if $lm > l_{TH}$, the graphic recognition mode is selected (step 3i). If $lm < l_{TH}$, whether the start point of the stroke is present in the same section as the previous stroke (step 3g). This carries out the segmentation of the character. If it is present in the same section in the step 3g, the process jumps to the step 3b where the strokes are again inputted and stored. FIG. 10 shows a data store condition in the stroke table when four strokes of the character "文" shown in FIG. 2 are in the same section No. 7. When the first stroke of the next character "字" is inputted, the start point of the stroke is in the next section No. 8. Accordingly, the decision in the step 3g of FIG. 7 is NO and the process proceeds to the step 3h where the character recognition mode is selected.

After the mode recognition, the hand-written character/graphic recognition is carried out (step 4). The recognized character or graphic is then displayed on the display (step 5).

Figure 8:
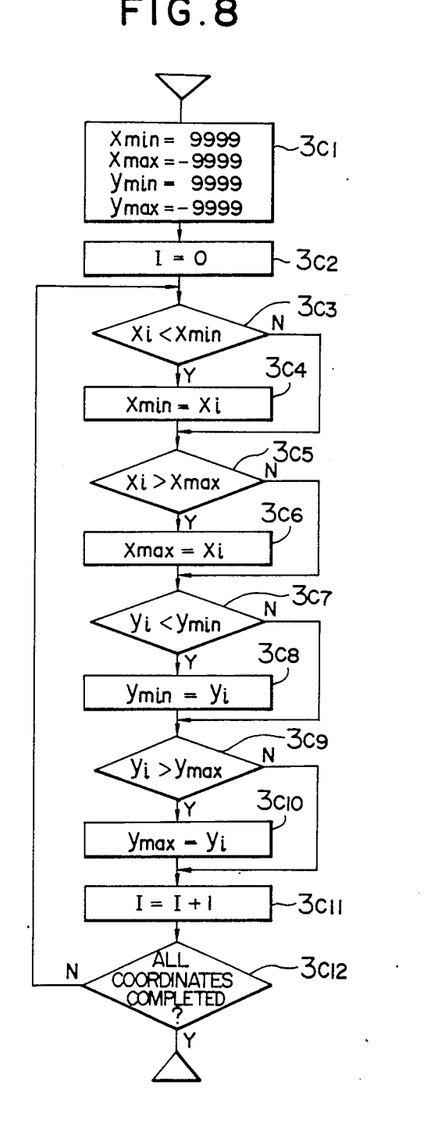
FIG. 8 shows a flow chart for minimum/maximum calculation in a step 3C of FIG. 7.

FIG. 8 shows a detailed flow chart for the minimum and maximum coordinate calculation in the step 3c.

Figure 9:
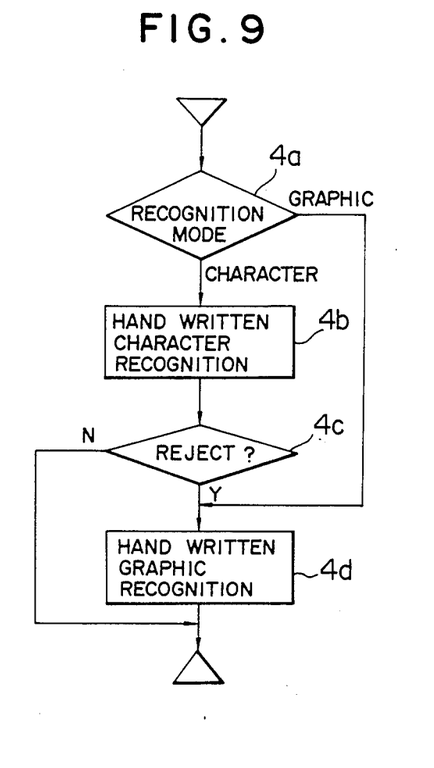
FIG. 9 shows a sub-flow chart of handwritten character/graphic recognition 4 in FIG. 1.

FIG. 9 shows a sub-flow for the hand-written character/graphic recognition in the step 4. If the recognition result for the hand-written character is rejected, the hand-written graphic recognition is initiated. (See the mode transition chart of FIG. 6).

The present embodiment offers the following advantages.

First, since the characteristic value for the character/graphic mode recognition is derived from the stroke information and it is compared with the threshold value to set the mode, the operator need not pay attention to the character/graphic mode when he/she input the hand-writing strokes. According, the function switches need not be operated and the characters and graphics can be inputted in a more natural manner and the man-machine interface is significantly improved.

Secondly, since the mode recognition is carried out for each stroke to recognize the character/graphic, a response is improved over the prior art method in which the recognition is made after all of the character and graphic have been inputted.

Thirdly, since the projection length of the stroke is used as the characteristic value for the mode recognition, it is independent from the complexity of the stroke and the stroke length and the character/graphic recognition can be effectively carried out.

Fourthly, since the character stroke is segmented by the section (input grid), the character is readily segmented.

Fifthly, since the mode is transitioned to the hand-written graphic recognition mode if the recognition result for the hand-written character is rejected, even a special graphic having a short stroke can be recognized.

Further, since the combined input/display device is used, the characters/graphics can be inputted in the same manner as if they are inputted by a pencil and a paper and the man-machine interface is significantly improved.

Referring to FIGS. 11 to 16, other embodiments of the present invention are explained.

Figure 11:
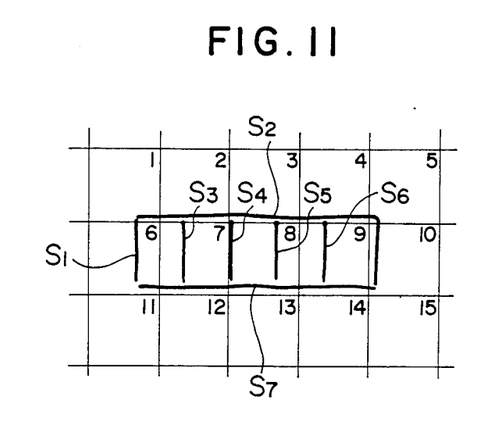
FIG. 11 shows an example of hand-writte graphic strokes.
Figure 12:
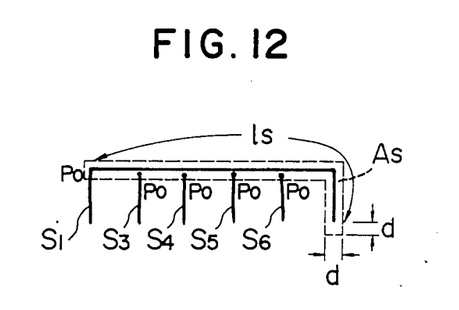
FIG. 12 illustrates a method for recognizing the hand-written graphic strokes shown in FIG. 11 as graphic strokes.

In the previous embodiment, if short bars such as strokes $S_3$-$S_6$ shown in FIG. 11 are inputted, those strokes are recognized as character strokes. In the present embodiment, when a graphic stroke $S_2$ having a stroke length $l_s$ is inputted, the stroke $S_2$ is translated to a line by the hand-written graphic recognition processing and an area As having a width d around the translated line is defined. It is called a graphic band. It is checked if a start point (Po) or an end point of the stroke is present in the graphic band. If it is present, it is recognized as a graphic stroke.

Figure 13:
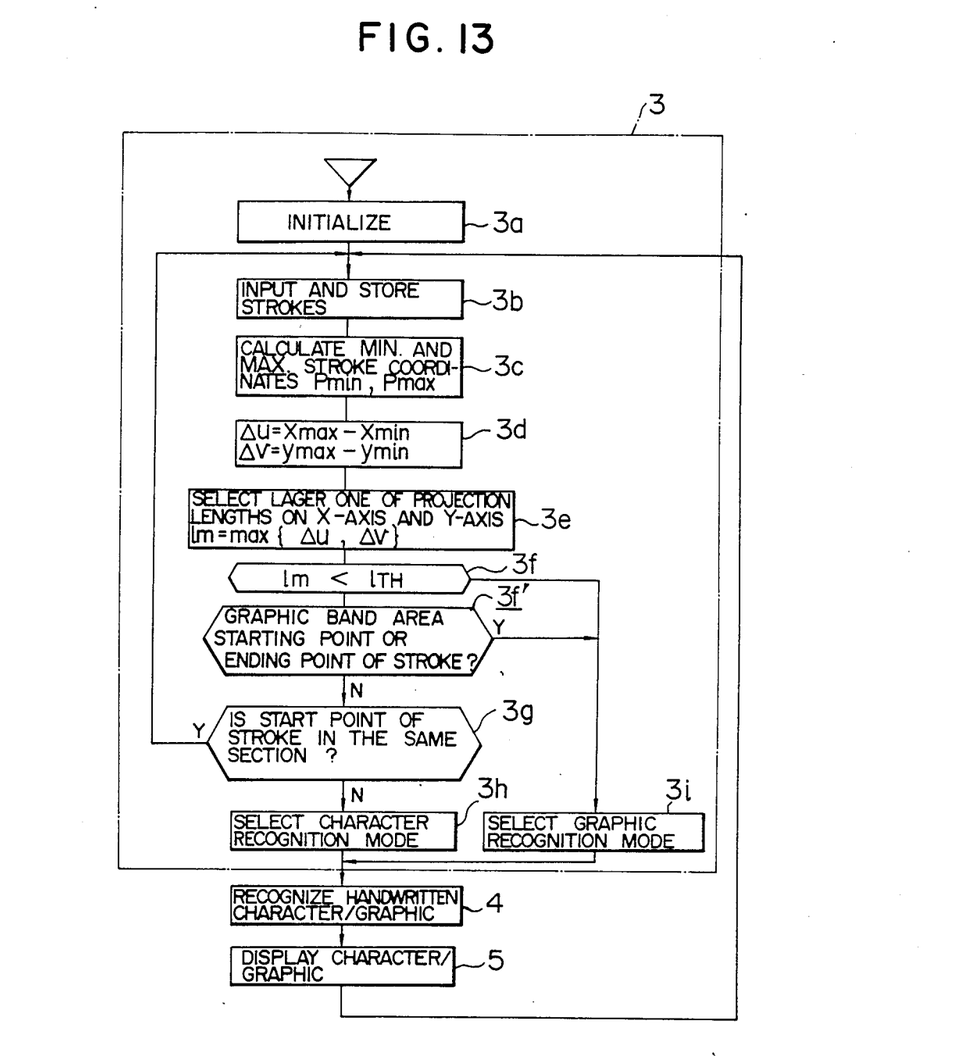
FIG. 13 shows a processing flow chart when the method of FIG. 12 is applied to FIG. 7.
Figure 14:
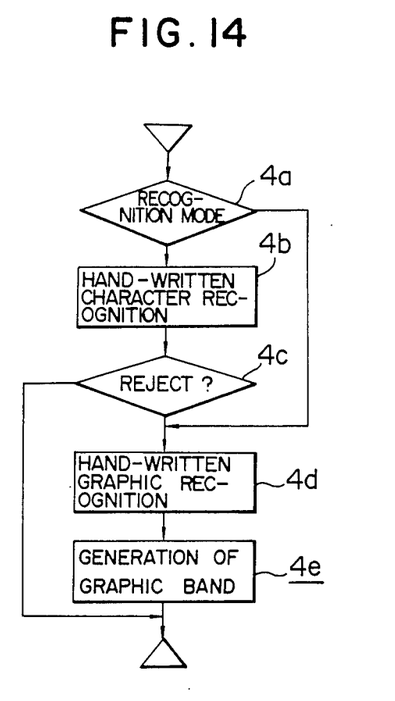
FIG. 14 is a sub-flow chart when the method of FIG. 12 is applied to FIG. 9.

The above processing may be carried out by adding a step 3f' shown in FIG. 13 after the step 3f shown in FIG. 7. The graphic band may be generated by adding a step 4e shown in FIG. 14 after the step 4d shown in FIG. 9.

In the present embodiment, when the short bars are inputted as described above, they are recognized as graphic strokes.

Figure 15:
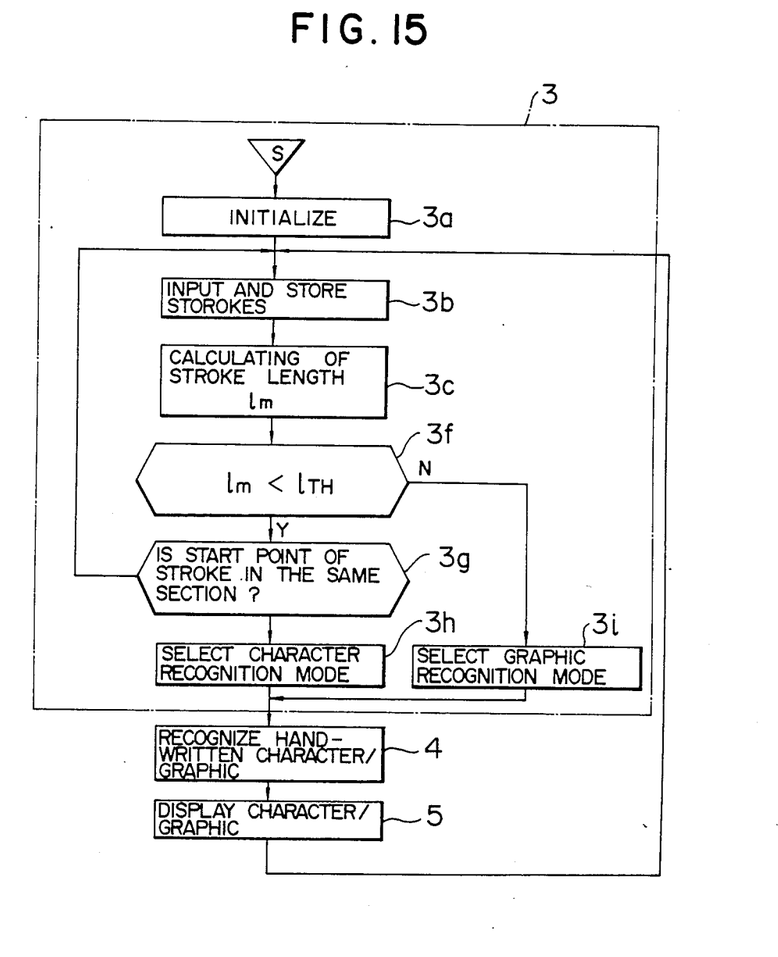
FIG. 15 is a processing flow chart in an embodiment in which a stroke length is used as a characteristic value.

FIG. 15 shows another embodiment. In the present embodiment, a stroke length lm is determined as the characteristic value and it is compared with a predetermined threshold $l_{TH}$.

Figure 16:
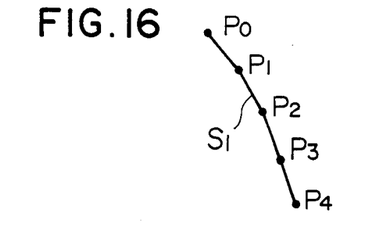
FIG. 16 illustrates how to determine the stroke length.

As shown in FIG. 16, the stroke length for the stroke $S_1$, for example, may be readily determined by summing distances between coordinate points $P_0$-$P_1$, $P_1$-$P_2$, $P_2$-$P_3$ and $P_3$-$P_4$.

In the present embodiment, similar advantage to that of the previous embodiment is offered because the character stroke is generally shorter than the graphic stroke.

Figure 17:
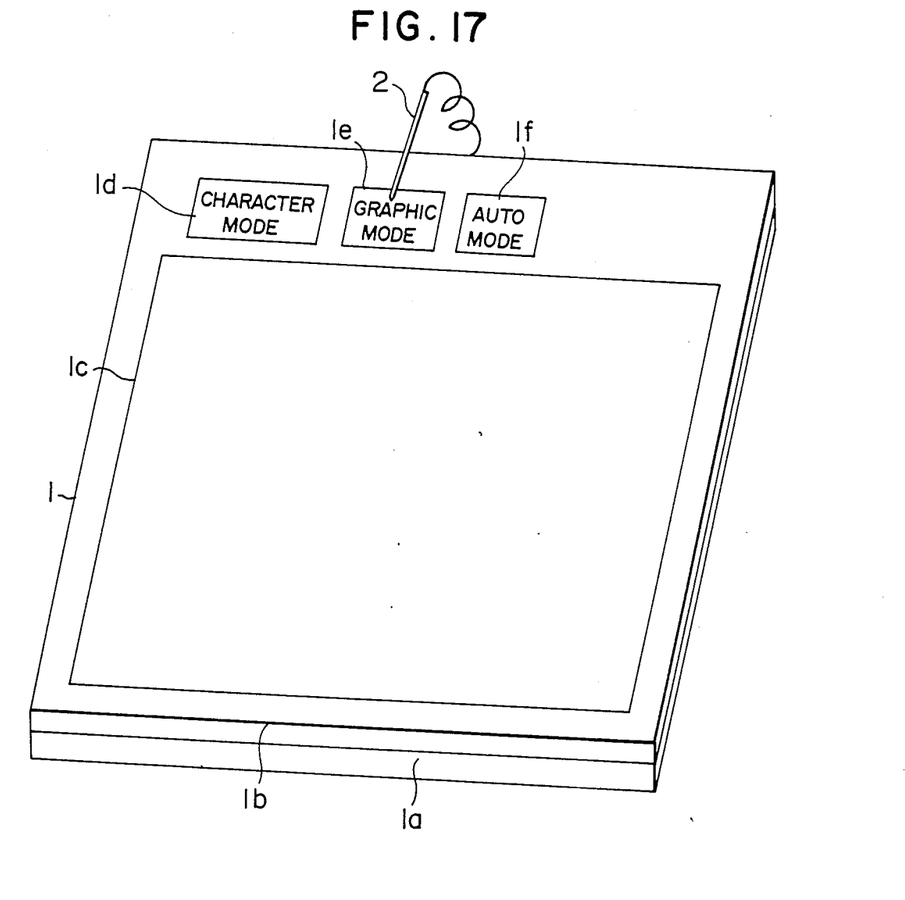
FIG. 17 shows an embodiment of an input/display device.

FIG. 17 shows another embodiment. Function areas 1d, 1e and 1f are provided in the coordinate input area of the coordinate input means 1 to allow selective designation of the character recognition mode and the graphic recognition mode. The function area 1d is used to designate the manual character input mode, the function area 1e is used to designate the graphic input mode, and the function area 1f is used to switch the mode from the selected designation to the automatic mode. If, in the automatic mode, the character or graphic recognition mode is designated, it is forcibly set. This is the manual mode, and the mode can be switched to the automatic mode by depressing the function area 1f. The strokes are inputted by the area 1c.

Figure 18:
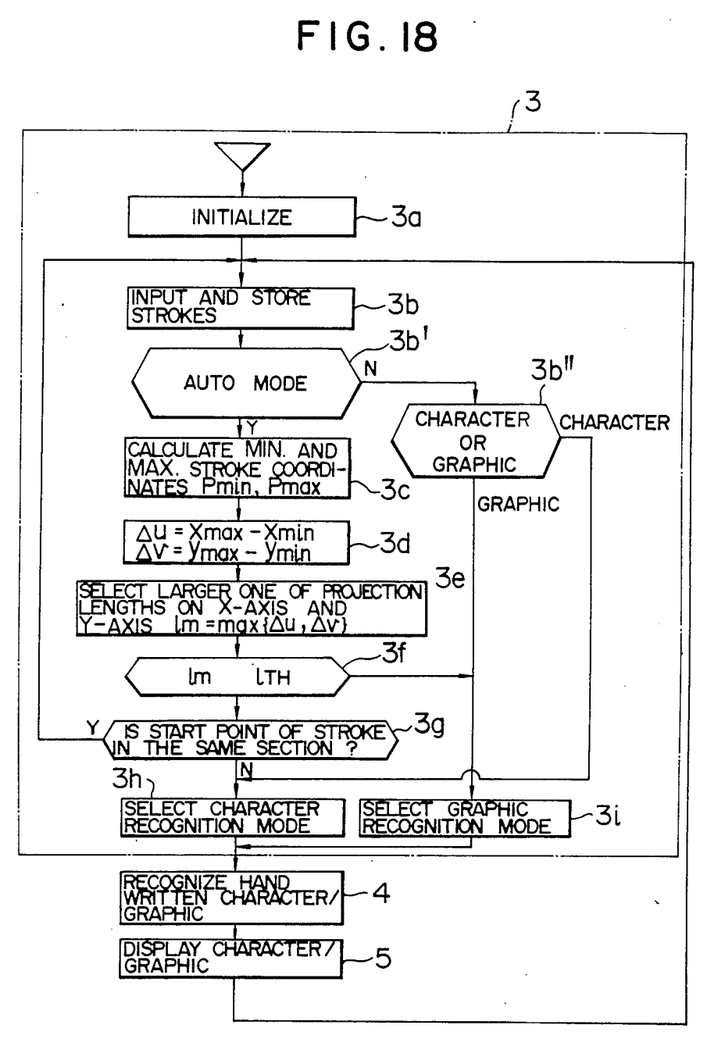
FIG. 18 is a processing flow chart corresponding to that shown in FIG. 7, when the input/display device of FIG. 17 is used.

FIG. 18 shows a flow chart corresponding to FIG. 7, when the embodiment of FIG. 17 is used. Difference from FIG. 7 is addition of steps 3b' and 3b'.

The present embodiment is effective when the mode designation cannot be achieved only by the stroke coordinates, such as when a large character or a small graphic is inputted.

We claim:

1. A method for designating a recognition mode in a hand-written character/graphic recognizer for recognizing a character/graphic in a character recognition mode or a graphic recognition mode designated in accordance with stroke information supplied from input means which samples a hand-written character/graphic and converts it to the stroke information, and converting the recognized character/graphic to a charater/graphic code, said method comprising the steps of:

extracting a characteristic value of the character/graphic from the stroke information supplied from said input means, said characteristic value being the stroke length determined from coordinates of the stroke included in the stroke information;

discriminating between character information and graphic information based on the extracted characteristic value each time each stroke information is supplied from said input means; and designating one of the character recognition mode and the graphic recognition mode in accordance with the result of said discrimination.

2. A method for designating a recognition mode in a hand-written character/graphic recognizer according to claim 1 wherein the characteristic values are projection lengths on x-axis and y-axis of the coordinates included in the stroke information.

3. A method for designating a recognition mode in a hand-written character/graphic recognizer according to claim 1 wherein the characteristic values are projection lengths on x-axis and y-axis of coordinates included in the stroke information, a longer one of the projection lengths on the x-axis and the y-axis is compared with a predetermined threshold for the hand-written character input, and if the projection length is smaller than the threshold, the character recognition mode is designated and if the projection length is larger, the graphic recognition mode is designated.

4. A method for designating a recognition method in a hand-written character/graphic recognizer according to claim 1 wherein if a start point of the input stroke is within a section preset for character segmentation, co-ordinates of the sequentially inputted strokes are stored, and if the start point of the input stroke is not in the same section, the coordinates of the strokes so far stored are delivered for character processing as a group of stroke coordinates of one character.

5. A method for designating a recognition method in a hand-written character/graphic recognizer according to claim 3 wherein if the projection length is larger than the threshold, the stroke is translated to a line and a graphic band having a predetermined width around the line is defined, and if the start point of the stroke is present in the graphic band, the graphic recognition mode is designated independently of the stroke length.

6. A method for designating a recognition mode in a hand-written character/graphic recognizer according to claim 1 wherein the stroke length is compared with a predetermined threshold to designate the character recognition mode or the graphic recognition mode.

7. A method for designating a recognition mode in a hand-written character/graphic recognizer according to claim 6 wherein if the stroke length is smaller than the threshold, the character recognition mode is designated, and if the stroke length is larger, the graphic recognition mode is designated.

8. A method for designating a recognition mode in a hand-written character/graphic recognizer according to claim 1 if a character is not recognized in the designated character recognition mode, the recognition mode is changed to the graphic recognition mode.

* * * * *